Sept. 8, 1942.  H. L. JOACHIM  2,295,215
ALPHA CELLULOSE PULP
Filed Sept. 16, 1940
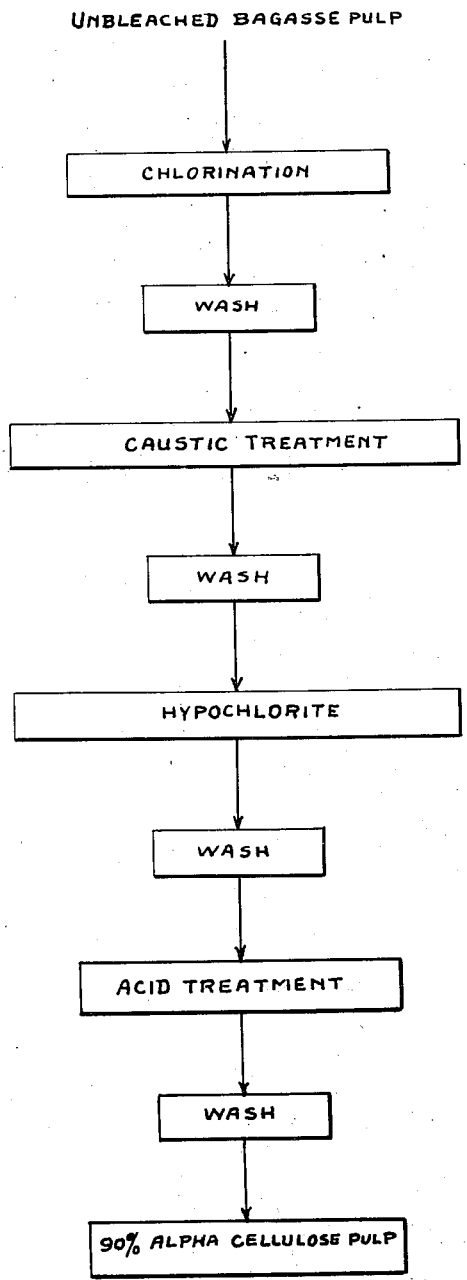
Inventor
Herman L. Joachim
By Lyon & Lyon
Attorneys Patented Sept. 8, 1942

2,295,215

UNITED STATES PATENT OFFICE 2,295,215

ALPHA CELLULOSE PULP

Herman L. Joachim, Los Angeles, Calif., assignor to Maui Agricultural Company, Ltd., a corporation of Hawaii Application September 16, 1940, Serial No. 356,929

4 Claims. (Cl. 8—105)

This invention relates to alpha cellulose pulp, and more particularly to a method or process for the chemical refining and purification of bagasse pulp to produce alpha cellulose pulp of a degree of refinement and purification suitable for use in the production of what is commonly referred to as viscose rayon, nitration products, and the like.

The alpha cellulose pulp produced in accordance with this invention is not limited to its use in the production of rayon yarn, but is of a degree of purification and refinement which renders the same particularly applicable for use in the nitration process or in the production of plastics and other cellulose derivatives, such as, ethyl, methyl and butyl celluloses, and in many other phases of the cellulose converting industry.

By far the greatest quantity of alpha cellulose now utilized in the production of paper pulp, viscose rayon, cellulose derivatives in sheet form, and other derivatives such as cellulose nitrate and cellulose ethers, is of that degree of purification and refinement ranging up to approximately 90% alpha cellulose. I thus distinguish from the greater degree of refinement and purification of alpha cellulose used in such processes as, for example, the acetate process of conversion to rayon yarn, which utilizes a cellulose pulp of a purification of another range, namely: 95% to 96% alpha cellulose.

Constantly increasing demand for alpha cellulose pulp for use in the production of paper pulp, viscose rayon, sheeting and other derivatives such as cellulose nitrates and cellulose ethers has produced a great demand for the relatively low, or approximately 90% alpha cellulose.

The principal raw materials now utilized for the production of 90 to 92% alpha cellulose are wood pulp and cotton linters, both of which raw materials are greatly demanded for the production or use in production of other products.

It has heretofore been recognized that bagasse derived from sugar cane presents a very important possible source of cellulose because of the fact that the sugar cane from which bagasse is derived grows rapidly and is an annual or biannual product. Although it has been recognized that bagasse presents a possible source of production of alpha cellulose, utilization of bagasse for this purpose has not heretofore been economically practiced. The literature contains various statements to the effect that bagasse might be treated by the same methods as are utilized for the treatment or refinement of wood pulp. This, however, I have found not to be true. The cellulose fibre of bagasse is peculiarly different both physically and chemically from the cellulose fibre of wood pulp and it is probably these fundamental differences of the fibre structures and of the impurities present that account for the fact that the bagasse fibre does not respond economically and practically to the refinement and purification processes commonly utilized in connection with wood pulp.

I have found that a bagasse pulp, after suitable delignification can be economically and practically treated to produce a pulp of approximately 90% alpha cellulose content having a low copper number, satisfactory viscosity, low soda solubility and negligible ether solubility. I have further found that when care is taken not to degrade the pulp during refining and purification, a cellulose pulp is produced which has such a physical fibrous structure that it readily absorbs water and aqueous solutions, permitting it to swell and react with those reagents commonly employed in the processes for conversion of the pulp to paper pulp or for production of viscose rayon, cellulose derivatives in sheet form and other derivatives such as cellulose ethers. The material thus produced, because of its physical and chemical characteristics, appears to more rapidly and completely react in these processes than do the alpha cellulose pulps derived from cotton linters or from refined wood pulp.

Depending upon the degree of delignification effected in the pulping operation, a bagasse pulp as produced from sugar cane grown in the Hawaiian Islands will require from $3\frac{1}{2}\%$ to 5% by weight on a dry basis of total chlorine to remove impurities present.

In purification of the bagasse pulp, it is preferable that the pulp, while in aqueous suspension, be chlorinated to only a limited degree. For example, in the production of approximately 90% alpha cellulose pulp I have found that on the bagasse derived from Hawaiian sugar cane the initial treatment of the pulp while in aqueous solution with chlorine should be carried out utilizing in the neighborhood of 75% of the total chlorine demanded to complete the chlorination.

Because of the peculiar characteristics of the fibre of bagasse, a drastic increase beyond 75% of the total chlorine requirement will degrade the pulp and will lower the yield of alpha cellulose, lowering the viscosity and producing an increase in the copper number.

The values given I have found to be rather critical for the particular bagasse as produced from sugar cane grown in the Hawaiian Islands and will apparently be critical for other bagasses derived from sugar cane grown in other localities, but it is apparent that the percentages may vary as to source and variety of the sugar cane.

It is apparent that initial chlorination plays a more important role in connection with the purification of an annual or biannual fibre like the fibre of sugar cane than it does in the case of wood pulp which is not an annual fibre, or in the case of the peculiar cotton linters.

In the process of my invention after initial chlorination I have found that the pulp should preferably be separated from the initial chlorination liquor as the same is illustrated in the flow sheet of the accompanying drawing.

After removal of the chlorination liquor, it is also preferable to wash the initially treated fibres to remove practically all of the water soluble chlorination residues before carrying out the further step of treatment with a caustic solution. After treatment with the caustic solution, it is preferable to again wash to remove substantially all of the remaining caustic solution and to thereafter supply all the subsequent requirement of chlorine in the type of a hypochlorite bleach liquor. After the hypochlorite bleach has been carried out, the resulting purified and refined fibre is again washed and dried in a suitable manner to enable its storage or transportation to the point of conversion.

In the production of the approximately 90% alpha cellulose, I have found that the quantity of caustic solution required for treatment is in the neighborhood of one part of pulp to 1.5 parts of caustic by weight. This caustic treatment is carried out in solution and the treatment will be completed in approximately one hour and at a temperature of approximately 175° F.

It is preferable that a mildly alkaline solution be used in this refining operation because the highly chlorinated pulp is quite sensitive to the caustic solution.

After the washing of the caustic solution from the material, a determination of the approximate viscosity is made and where it is found that the viscosity is satisfactory, the final chlorine demand is supplied most effectively as sodium hypochlorite and this final chlorination operation is carried out usually at room temperatures of preferably below 80° F. to prevent too rapid chlorination. If it is found in the test following the caustic treatment of the partially chlorinated cellulose pulp that the viscosity is not satisfactory, the material may be washed, depending upon the viscosity desired, with a mineral acid such as hydrochloric acid, and in this case, this mineral acid treatment step precedes the final chlorination. The adjustment of the viscosity is carried out in approximately 20 to 30 minutes with a suitable concentration of the mineral acid where the pulp is at approximately a 4% consistency. It is necessary where the use of mineral acid is resorted to to adjust the viscosity of the bagasse alpha cellulose pulp that the treatment with the mineral acid be carried out at temperatures not to exceed 80° F. because above this temperature I have found that the pulp is very rapidly degraded.

It will be apparent that depending upon the desired viscosity of the pulp more or less acid may be employed.

It will also be apparent that other acids than hydrochloric may be utilized such, for example, as sulphuric, nitric, phosphoric, and the like.

As an example of the acid treatment to adjust the viscosity, I have employed 7 liters of 36% HCl to 200 pounds of dry pulp, which served to give a pulp of a viscosity of 18 to 25 centipoises in a 1% solution. The acid treated pulp was then washed on a continuous washer until the pH of the wash water had dropped to about pH 7.2-7.6.

Because of the peculiarities of bagasse pulp as derived from certain types of sugar cane, and apparently because of the inherent characteristics of the cellulose fibre of this particular origin, it is always essential to avoid over-chlorination. Not only is this true in the final step of chlorination as hereinabove set forth, but it is also true in the initial chlorination where only approximately 75% of the total chlorination is utilized. In carrying out the initial chlorination step, it is advisable to maintain the temperature at not to exceed 80° F. as it is found that if the temperature does exceed 80° F. over-chlorination of portions of the pulp will result with consequent degrading.

In carrying out the initial chlorination step, it is preferable to place the pulp in an aqueous suspension of 3% to 3.5% consistency and chlorination is carried out by addition of approximately 75% of the total chlorine demand of the pulp. The time required for carrying out the chlorination is generally from 20 to 30 minutes and the end point is determined by carrying the process to where only a trace of chlorine can be found.

After the alkaline diffusion treatment the pulp is again washed with warm water until the pH has fallen to 8.2-8.6. It will be apparent from the foregoing that the operations as herein set forth may be carried out either as continuous or batch operations, as desired.

The definite specifications of time temperature and concentration as herein set forth, it will be obvious, are variable, depending to some extent upon the character of the bagasse used and also because the reaction, particularly of chlorination, is one particularly critical to temperature and concentration variations. The use of 75% of the total chlorine requirement in the initial chlorination step is set forth as the maximum of the total chlorine requirement which may be utilized using bagasse grown in the Hawaiian Islands and at room temperatures which average about 80° F. at that locality. As the temperature of chlorination is reduced, however, slight increases in the proportion of total chlorine requirement may be utilized, and it will be obvious that if chlorination is carried out at very low temperatures, the proportion of the total chlorine required in the initial chlorination step might be materially increased. Of course it is not necessary to utilize up to the maximum possible proportion of total chlorine in the initial chlorination step. The reason for using the greatest quantity possible is purely economical because the second chlorination step is carried out in using more expensive chemicals and in a more costly operation. It is believed that in no event should the quantity of chlorine utilized in the initial chlorination step be reduced to below a majority of the total chlorine requirement. There is, of course, another variable in handling the chlorine as free chlorine which is particularly dependent upon the solubility of chlorine as the temperature is varied.

Having fully described my invention and the preferred method in which it is to be carried out, it is to be understood that I do not wish to be limited to the details herein set forth, but my invention is of the full scope of the appended claims.

I claim:

1. A process for purifying a substantially delignified but substantially otherwise untreated bagasse pulp comprising treating an aqueous solution of said pulp with free chlorine in an amount of approximately 75% of the total chlorine demand of the pulp at about room temperature, removing resultant chlorination liquor from the pulp and washing the pulp, treating the washed pulp with an alkaline solution at an elevated temperature, washing the pulp, treating the washed alkali-treated pulp with a hypochlorite solution containing substantially the additional chlorine required to chlorinate the remaining impurities, and washing the treated pulp.

2. A process of purification of a substantially delignified but substantially otherwise untreated bagasse pulp to produce an alpha cellulose pulp of an approximate 90% grade comprising treating an aqueous suspension of said pulp with free chlorine with a majority of the order of 75% of its total demand of free chlorine and at a temperature below 80° F., washing the chlorine treated pulp, treating the washed pulp with an alkaline liquor, washing the alkali-treated pulp, treating the washed purified pulp with a hypochlorite solution containing substantially all additional chlorine required to satisfy said pulp and at a temperature below 80° F.

3. A process of purification of substantially delignified but otherwise substantially untreated bagasse pulp, which comprises treating an aqueous suspension of said pulp at room temperature with chlorine to the extent of a majority of the order of 75% of its total demand of free chlorine, and until the chlorine is substantially completely utilized, treating the pulp with a caustic solution, washing the pulp, and then treating the pulp with the remaining quantity of the requirement of chlorine in the form of a hypochlorite solution.

4. A process of purification of substantially delignified but otherwise substantially untreated bagasse pulp, which comprises treating an aqueous suspension of said pulp at room temperature with a majority of the order of 75% of its total demand of free chlorine and until the chlorine is substantially completely utilized, washing the pulp, treating the pulp with a caustic solution, washing the pulp, treating the pulp to adjust its viscosity with a mineral acid at a temperature not to exceed 80° F. and where the pulp is of a consistency of approximately 4%, and then treating the pulp with the remaining quantity of the chlorine requirement in the form of a hypochlorite solution, and washing the pulp.

HERMAN L. JOACHIM.